Figure 1:
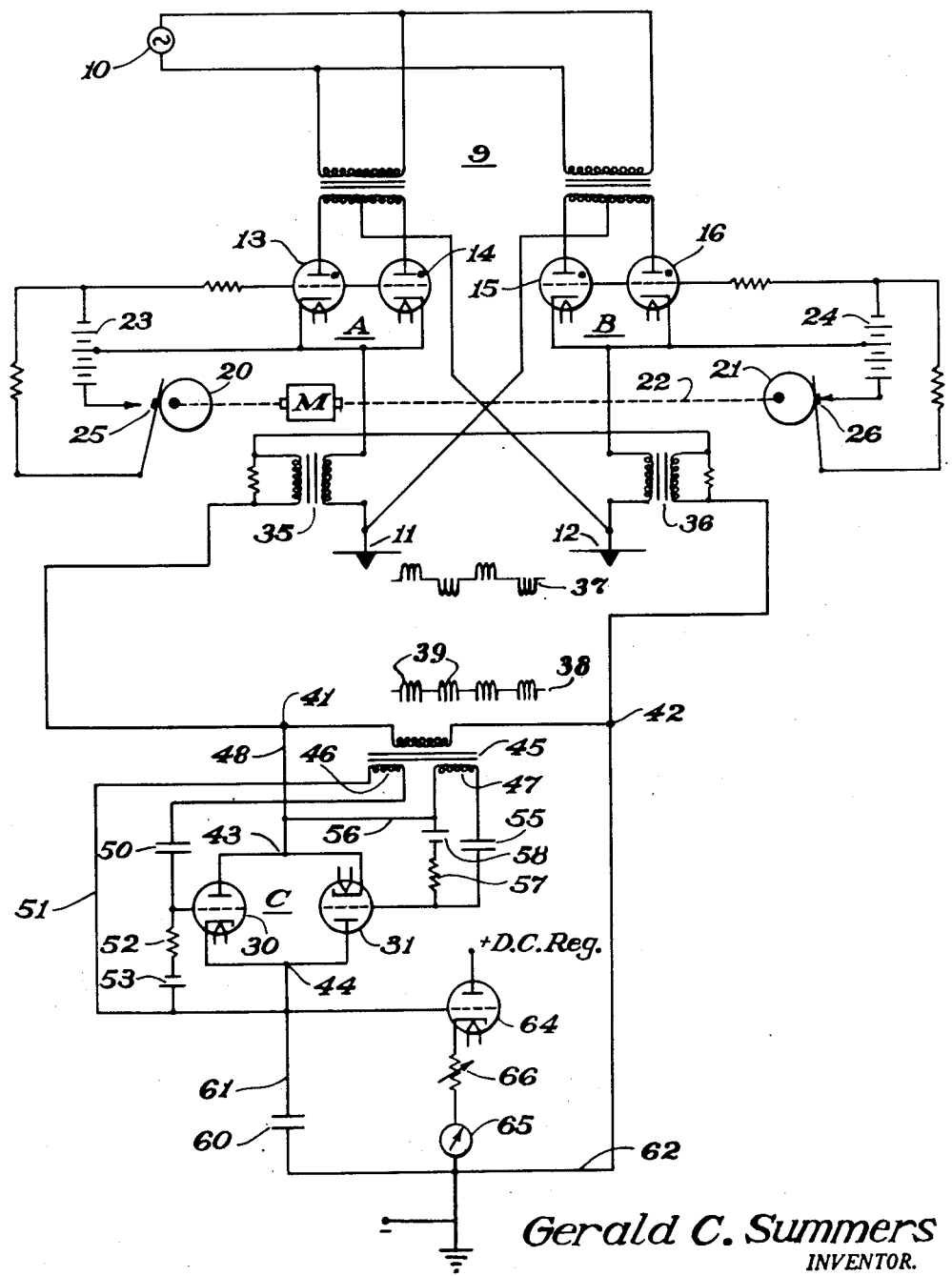

Sept. 18, 1951    G. C. SUMMERS    2,568,689
ELECTRONIC AMMETER

Filed Jan. 24, 1949    2 Sheets-Sheet 1

Gerald C. Summers
INVENTOR.

BY Sidney A. Johnson
ATTORNEY

Gerald C. Summers
INVENTOR.
BY Sidney O. Johnson
ATTORNEY

Patented Sept. 18, 1951

2,568,689

UNITED STATES PATENT OFFICE 2,568,689

ELECTRONIC AMMETER

Gerald C. Summers, Dallas, Tex., assignor, by mesne assignments, to Socony-Vacuum Oil Company, Incorporated, New York, N. Y., a corporation of New York Application January 24, 1949, Serial No. 72,362

14 Claims. (Cl. 171—95)

This invention relates to electric measuring instruments and more particularly to an electronic ammeter which provides a continuous indication or measurement of the peak amplitude of electric pulses independent of the duration of the pulse or the space between successive pulses.

Though the device of the present invention is suitable for use in many fields for measurement of the peak amplitude of electric pulses, particular application is found in the field of geophysical prospecting where a series of current pulses alternately of reversed polarity and of relatively low frequency are applied to the earth. In such a prospecting system, the amplitude of the pulses must be known and/or controlled throughout a period during which measurements are made.

In some systems, it is necessary to measure the absolute value of the pulse. In systems of this type, it has been customary to utilize a hot-wire ammeter to measure the current flowing in the earth. However, where precise measurements are required, a hot-wire ammeter may not be relied upon because its sensitivity for one direction of current flow is different from that for the opposite direction. This discrepancy is attributed to the inherent characteristics of a thermal instrument measuring currents reversing in direction.

In addition to the foregoing limitation, the thermal lag of such an ammeter makes its use undesirable. In order to determine the magnitude of the current pulses and to determine whether or not alternate pulses are the same, it is necessary to take measurements at a frequency sufficiently low to allow the meters to reach a maximum during each pulse. For example, in a prospecting system, it is necessary to make a calibration before and after taking measurements. The calibration is made at a frequency low compared to the frequency at which measurements are customarily made. For the purposes of calculations, it is then assumed that variations in the current during the measuring period are linear and that an average of the initial and final current reading may be relied upon as the average current for the measuring period.

The instrument of the present invention overcomes the inherent disadvantages of prior art measuring systems and procedures such as above described by providing a continuous indication of the amplitude of the pulses applied to the earth. The indicating device is responsive instantaneously to changes in amplitude.

More particularly, and in accordance with the present invention, the ammeter comprises two vacuum tubes, preferably triodes, forming a series loop or space path having variable bilateral conductance with a condenser in series with the loop and the source of the impulses. An indicating means having a high impedance input yields a reading proportional to the charge on the condenser. Means associated with the grid circuits of the triodes varies the conductance of the loop, rendering one of the triodes conductive during application of the pulses. The magnitude and direction of current flowing to or from the condenser during conduction of one or the other of the triodes is proportional to the algebraic sum of the voltage across the condenser plus the magnitude of the pulse. Accordingly, the voltage measured by the indicating means is continuous and is proportional to the magnitude of the pulse voltage.

Figure 2:
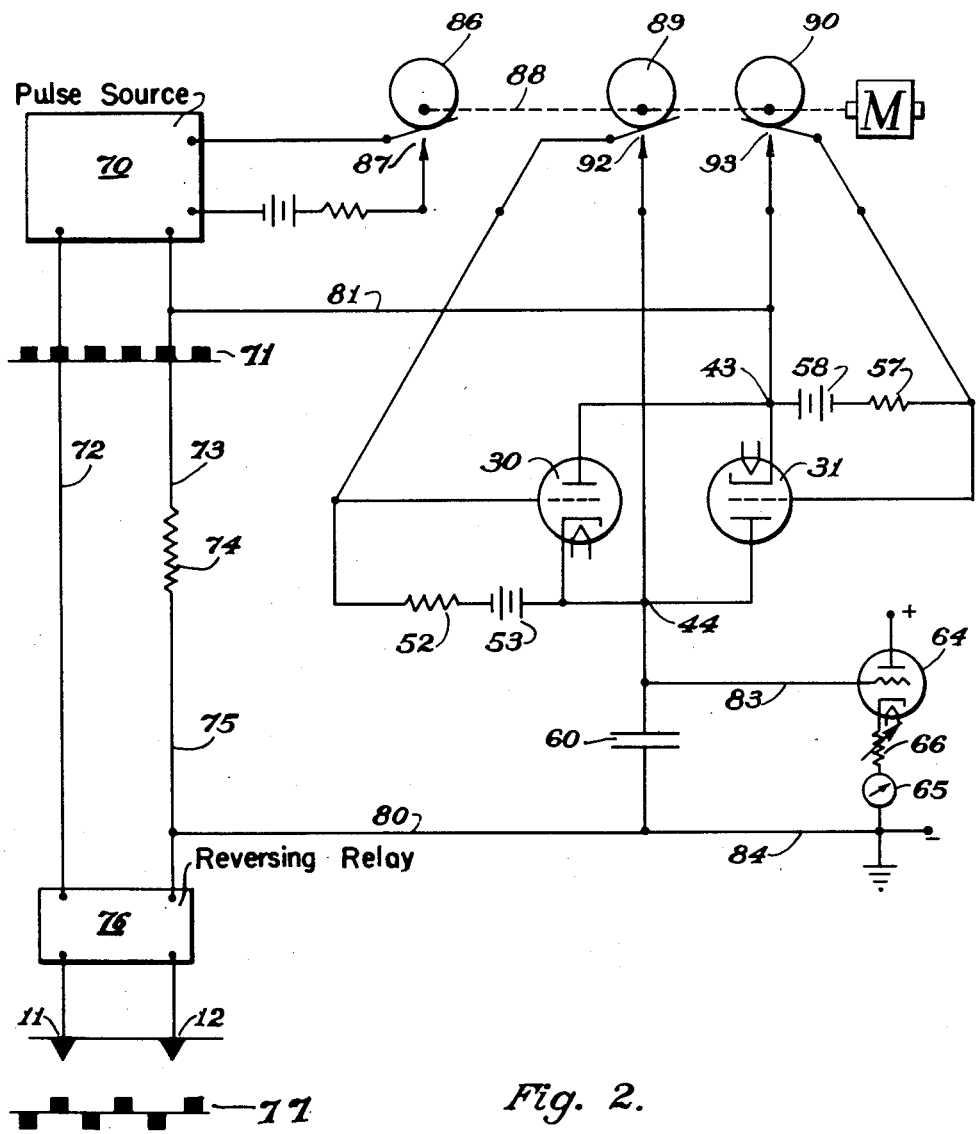

For more complete description of the invention and for further advantages thereof, reference should be had to the following description taken in conjunction with the accompanying drawing in which;

Fig. 1 is a schematic diagram of the electronic ammeter of the present invention as applied to the measurement of the output of a pulse generator; and Fig. 2 is a modification of the electronic ammeter of Fig. 1 for measuring peak values of intermittent rectangular pulses.

In the system illustrated in Fig. 1 a pulse generator 9, the measurement of the output of which is used to illustrate an application of the present invention, comprises two full-wave rectifiers A and B connected in parallel and to a source of alternating current 10. The output of each of the rectifiers A and B is applied to the earth at electrodes 11 and 12. The full-wave rectifiers are of the thyratron type and may be alternately switched on and off for conduction over periods of predetermined lengths. More particularly, a switching arrangement in the grid circuit of the thyratrons 13 and 14 of rectifier A is operated in synchronism with the grid circuits of thyratrons 15 and 16 of rectifier B. Switching is accomplished by means of the cams 20 and 21 driven by any suitable means such as a motor M coupled to a shaft indicated by line 22. The driving means or motor M for the switching cams is variable in speed for operation at the desired frequency. For example, between ½ and 20 or 30 revolutions per second.

Batteries 23 and 24 initially bias both rectifiers A and B so that they are non-conductive. A voltage positive in polarity from a suitable source, such as the lower portion of battery 23, is applied to the grids by closure of the switches 25 and 26 driven by cams 20 and 21, respectively. Upon application of the positive bias to the grids, the thyratrons become conductive. The period of conduction is determined by the period of closure of the contacts of switches 25 and 26. As illustrated, the switch 25 is open, thus causing rectifier A to be non-conductive. The switch 26 is closed, raising the potential of the grids of rectifier B sufficiently to permit conduction. Upon rotation of the cams 20 and 21, spaced full-wave rectified pulses alternately of opposite polarity flow between electrodes 11 and 12.

It is desirable in operations involving use of such pulses to provide a continuous indication of their magnitudes. In accordance with the present invention, such an indication is obtained through the use of the ammeter circuit which includes a series loop C formed by the electric valves shown in the form of triodes 30 and 31. As illustrated, the cathode of triode 30 is connected to the plate of the triode 31 while the cathode of triode 31 is connected to the plate of triode 30, thus forming the local series loop C. A voltage derived from the current flowing through the earth impedance between electrodes 11 and 12 is applied to the loop C. The voltage for such application is derived through transformers 35 and 36. The primary of transformer 35 is connected in circuit with the rectifier A and thus has an output only when rectifier A is conducting. Similarly, the primary of transformer 36 is connected in circuit with rectifier B and has an output only when rectifier B is conducting. The secondaries of transformers 35 and 36 are connected in series and are so poled that, as viewed from series circuit C, a series of pulses of the same polarity are derived from the currents flowing in the earth impedance. The currents flowing in the earth impedance essentially are as illustrated by the wave form 37 while the pulses derived therefrom are illustrated by the wave form 38.

The voltage of wave form 38 appears between points 41 and 42. If a series condenser 60 is initially uncharged, this voltage $E_{41-42}$, is applied between the points 43 and 44 on the loop C, a circuit having variable bilateral conductance. Voltage $E_{41-42}$ also is applied to the primary of a transformer 45 which has identical secondary windings 46 and 47. The secondary windings 46 and 47 are connected in the grid-cathode circuits of triodes 30 and 31, respectively, so poled as to excite the grids in phase. More particularly, and as illustrated, one terminal of the secondary 46 is connected through condenser 50 to the grid of triode 30. The other terminal of secondary 46 is connected by way of conductor 51 to the cathode of triode 30. Additionally, a grid resistor 52 and a bias battery 53 are connected between grid and cathode.

In the grid-cathode circuit of tube 31, one terminal of secondary 47 is connected through condenser 55 to the grid of triode 31 while the other terminal is connected to the cathode by way of conductor 56. A grid resistor 57 and a bias battery 58 are connected between grid and cathode. The secondaries 46 and 47 are so poled that the grids of the triodes 30 and 31 are in phase. Batteries 53 and 58 bias the triodes 30 and 31 to plate current cut-off except during application of a voltage above a predetermined minimum value to the transformer primary 45.

Application of pulses of the form 39, each pulse comprising a series of full-wave rectified sine waves, to the grids of tubes 30 and 31 causes grid currents to flow during positive excursions of the grids. This action develops an additional negative bias voltage across condensers 50 and 55. In the interval between successive half-waves of the rectified voltage the bias voltages across condensers 50 and 55 decrease at a rate depending upon the condenser size and upon the magnitude of the resistors 52 and 57. These components preferably are chosen to cause a relatively slow condenser discharge to prevent conduction through the tubes 30 and 31 except near the peaks of the grid voltage.

The condenser 60 is connected in series with the loop C and the source of voltage $E_{41-42}$. The series circuit includes conductor 61, connected to point 44 of the loop C and to one terminal of the condenser 60. The conductor 62 completes the circuit from point 42 to the other terminal of condenser 60. Application of a voltage to points 41 and 42 charges condenser 60 through the interelectrode resistance of the loop C. A high impedance circuit is connected across the terminals of condenser 60 to measure this voltage. The measuring circuit, essentially a vacuum tube voltmeter, includes a vacuum triode 64 and an indicating device such as an ammeter 65. The plate of the triode 64 is supplied by a regulated D. C. voltage. The ammeter 65 and a calibrating resistance 66 are connected in the cathode circuit of the triode 64. Any variation in the condenser voltage will be reflected as a change in cathode current indicated by ammeter 65. Since the measuring circuit is high impedance, the only possible discharge path for condenser 60 is through the loop C, conductor 48, transformer primary 45 and conductor 62.

In operation, upon application of a current pulse to the earth impedance between electrodes 11 and 12, one or the other of triodes 30 and 31 will conduct. For purposes of the following description, assume that the peaks 39 of the pulses 38 cause the plate of triode 30 to become positive and that simultaneously the grids of both tubes are made less negative with respect to their cathodes. Since positive voltages are applied to the plate and the grid of triode 30 simultaneously, plate current will flow. Accordingly, if the condenser 60 is initially uncharged, application of the voltage $E_{41-42}$ charges the condenser 60 to a voltage equal to the peak amplitude of voltage $E_{41-42}$. There will be no current flowing through the triode 31 because its plate is negative during the period when its grid is sufficiently positive to permit conduction. The bias from battery 53 plus the bias developed across condenser 50 by the flow of grid current permits tube 30 to conduct only on peaks of the pulses. For subsequent pulses, the plate voltage $E_{43-44}$ will be equal to the instantaneous value of the pulse minus the voltage across condenser 60. When the voltage across condenser 60 is equal to the pulse voltage, the voltage $E_{43-44}$ is equal to zero and no current flows.

At the end of the first pulse, the condenser 60 has acquired a charge equal to the peak amplitude of the applied pulse, and voltage across the condenser 60 as applied to the grid of triode 64 determines the cathode current indicated by the ammeter 65. During the period between pulses, the voltage across the condenser 60 is effective between points 43 and 44 causing the plate of triode 31 to be positive with respect to its cathode.

However, since battery 58 negatively biases the grid of the triode 31 to cut-off, the charge from condenser 60 cannot leak off through triode 31 and the current measured by the ammeter 65 remains constant during the interval between pulses.

Assume now that the second pulse is of amplitude lower than the first pulse. In such case, the sum of the voltages $E_{41-42}$ and $E_{60}$ will be opposite in sign to that of voltage $E_{43-44}$ of the first pulse. Accordingly, point 44 will be positive with respect to point 43. Since the grid of the triode 31 is positive during applications of the pulse, the triode 31 may conduct to remove a portion charge from condensers 60. Stated otherwise, the conductivity of the loop C is changed in direction, depending upon the sign of the sum of voltages $E_{60}$ and $E_{41-42}$, and in amount proportional to the magnitude of the sum. The resultant variation in voltage $E_{60}$ changes the cathode current of tube 64 to a new value which is indicated by the ammeter 65.

From the foregoing description of the operation of the ammeter circuit, it is evident that a change in amplitude of the current pulse being measured results in an immediate and rapid change in the resistance of the charging path for condenser 60. If alternate pulses in a series have different amplitudes, the ammeter will follow the variations as rapidly as the inertia of the meter will permit. The result is that the ammeter oscillates between two values as long as there is an amplitude difference. An operator observing the meter may make adjustments in the pulse generator until the pulses are of equal amplitude and the ammeter reading is steady. The magnitude of the current is indicated continuously and is not limited in frequency as is a thermal element. The rapidity of the response, governed by the time constant of the circuit for condenser 60, may be made sufficiently small that the inertia of the meter is the limiting factor even though the meter chosen for this application may have relatively low inertia.

A modified form of the ammeter circuit is illustrated in Fig. 2. In order to simplify the description, elements corresponding to those of Fig. 1 have been given the same reference characters. In this system, intermittent pulses are generated by a source 70. The output to be measured is illustrated as having wave form 71 and is applied through conductors 72 and 73, resistor 74 and conductor 75 to a reversing relay 76. In this system, the relay reverses alternate pulses so that currents having the wave form 77 are applied to the earth between electrodes 11 and 12. The voltage developed through resistor 74 is utilized in the ammeter circuit to measure the peak amplitude of the rectangular unidirectional pulses 71. More particularly, the voltage across resistor 74 is applied through conductors 80 and 81 and condenser 60 to points 43 and 44 of the loop having variable bilateral conductance elements comprising the series triodes 30 and 31.

In this modification, resistors 52 and 57 and bias batteries 53 and 58 are included in the grid-cathode circuits of tubes 30 and 31, respectively. In order to produce a potential between leads 83 and 84, which at all times indicates the maximum value of the wave 71, the bias batteries 53 and 58 effectively must be removed from the circuit to raise the potential of the grids of tubes 30 and 31 sufficiently to allow conduction of one of the two triodes during at least a portion of the time in which current flows through resistor 74. Preferably, and as illustrated, cam 86, which generically represents a means for controlling the generator 70 to turn the current on and off by closure of switch 87, is mechanically coupled by way of shaft 88 to additional cams 89 and 90. A switch 92 is operated by cam 89 and a switch 93 by cam 90. The cams are phased in this system for simultaneous operation of switches 87, 92 and 93. The potential across resistor 74 is applied to points 43 and 44 of the loop (assuming zero initial charge on condenser 60). At the same time switch 92 is closed thereby to render ineffective the bias battery 53 and to raise the grid of tube 30 to cathode potential; similarly switch 93 shorts battery 58 in series with resistance 57 to render it ineffective, and thereby raises the grid of tube 31 to cathode potential.

Assuming now that conductor 81 is positive with respect to conductor 80 when a current pulse flows in the earth circuit, the plate of tube 30 would be positive with respect to cathode by an amount initially equal to the voltage across resistor 74. Condenser 60 would thereafter, due to flow of current through tube 30, acquire a charge and rapidly would reach a potential equal to the voltage across resistor 74. The variation of the voltage across condenser 60 as a function of time after switches 87, 92 and 93 are closed is an exponential function. If the time constant of the charging circuit is less than the period of one pulse, the condenser will be charged to voltage $E_{74}$ within the duration of the initial pulse. In this circuit the time constant would be equal to the product of $R_{74}$ plus the plate resistance of tube 30 or 31, taken individually multiplied by $C_{60}$.

Thus, as above described, a voltage derived from the earth current circuit is applied to the ammeter to provide a continuous indication of peak amplitude of intermittent pulses. The derived voltage is utilized both to charge a condenser 60 and to change the conductivity of the bilateral space bath formed by triodes 30 and 31.

Since, in the modification of Fig. 1, the measured voltage is used to switch the triodes 30 and 31, it is evident that there is a lower limit for any specific set of circuit elements beyond which the indication on ammeter 65 may not be relied upon. For example, in one embodiment of the invention where the current flowing through the electrodes 11 and 12 was maintained at 2.5 amperes, the lower limit for the ammeter was approximately ⅓ ampere. In order to operate the ammeter circuit for measurements in this range, the transformers 35, 36 and 45 were chosen to produce proper voltages on the grids and plates of tubes 30 and 31 for operation with bias batteries 53 and 58 included in the grid circuit. In this embodiment, the triodes 30 and 31 were the two sections of a 6SN7-GT tube. The bias batteries 51 and 53 were 7½ volts. The transformers 35 and 36 were of the type commonly used for six volt filament supply. The condenser 60 was .05 microfarad. The foregoing constants and circuit elements, while suitable for one embodiment of the invention, are to be taken as suggestive and not as limiting the invention. Other circuit parameters and tubes will be selected in accordance with the selected requirements of an ammeter to be constructed in accordance with the present invention. It is evident that by applying the voltage to be measured in the proper magnitude with respect to the voltage of the bias batteries 51 and 53, an ammeter of the type here disclosed may be constructed to meet the demands of a wide range of applications.

While particular embodiments of the invention have been illustrated and described, it will be understood that further modifications may be made. It is therefore intended to cover such modifications as fall within the scope of the appended claims.

What is claimed is:

1. A system for measuring the maximum amplitude of spaced unidirectional electrical impulses comprising a condenser, a circuit having variable bilateral conductance elements in series with said condenser, means for varying the conductivity of said elements and of said circuit during at least a portion of each of said impulses means for applying said impulses to said circuit for charge of said condenser through one element and discharge through the other element to maintain a unidirectional charge on said condenser proportional to the maximum amplitude of each impulse and a measuring circuit including indicating means for measuring the voltage across said condenser.

2. A system for measuring the maximum amplitude of each of a series of electric impulses which comprises a condenser, a normally non-conductive path including two triodes in circuit with said condenser, means for raising the conductivity of one of said triodes to charge said condenser, means for raising the conductivity of the other of said triodes for discharge of said condenser, a circuit for applying each of said impulses to said condenser through said normally non-conductive path to control the magnitude of the charge thereon, and means including a high impedance circuit for continuously measuring a function of said charge on said condenser.

3. A system for measuring the maximum amplitude of the output from a source of spaced electrical impulses which comprises two triodes biased to plate current cut-off and connected in a local series loop, a condenser in circuit with said local series loop and said source, a circuit including indicating means responsive to the voltage across said condenser and means for decreasing the bias on said triodes during application of each of said spaced impulses to permit conduction through said loop during application of each of said impulses proportional to the algebraic sum of the voltage across said condenser and the voltage of said impulses.

4. A system for continuously indicating the maximum amplitude of the output from a source of intermittent electrical pulses which comprises two triodes forming a loop, a condenser and said source of impulses connected in series with said loop, indicating means responsive to the potential across said condenser, means for biasing said triodes to plate current cut-off, and means for simultaneously decreasing the bias on both of said tubes during application of said pulses for rendering one of said triodes conductive to maintain the charge on said condenser proportional to said maximum amplitude.

5. A continuously indicating peak-value ammeter which comprises a condenser, two triodes in circuit with said condenser, the cathode of a first of said triodes and the plate of the second of said triodes being connected to one terminal of said condenser, a circuit including a source of impulses to be measured connecting the other terminal of said condenser to the plate of said first triode and to the cathode of said second triode, means associated with the source of said impulses for raising the grid cathode potential of each of said triodes during at least a portion of each of said impulses to charge said condenser in proportion to the peak amplitude of said impulses, biasing means in the grid-cathode circuit of each of said triodes to maintain them non-conductive between said pulses and a high impedance circuit including indicating means for measuring the voltage across said condenser.

6. A continuously indicating peak-value ammeter which comprises a condenser, a loop having variable bilateral conductance elements in series with said condenser, a circuit including a source of impulses to be measured connected to said series circuit, means for applying said impulses to said elements for varying their conductance during application of each of said impulses, said elements respectively controlling the conductivity of a charging circuit and of a discharge circuit for said condenser to maintain the charge on said condenser proportional to the maximum amplitude of each of said impulses and a high impedance measuring circuit including indicating means for measuring the voltage across said condenser.

7. A peak reading continuously indicating ammeter which comprises a condenser, two triodes in circuit with said condenser, the cathode of the first of said triodes and the plate of the second of said triodes being connected to one terminal of said condenser, a circuit including a source of impulses to be measured connecting the other terminal of said condenser to the plate of the first and cathode of the second triode, an inductive coupling between said source of impulses and the grid-cathode circuits of each of said tubes to raise the grid-cathode potentials of said triodes in synchronism with said impulses, a bias battery connected between the grid and cathode of each of said triodes to maintain them non-conductive during periods between said pulses and a high impedance circuit for measuring the voltage across said condenser.

8. A peak reading continuously indicating ammeter which comprises a loop having variable bilateral conductance elements, a condenser connected to said loop, a transformer having at least one primary winding connected in series with said condenser and said loop for applying unidirectional impulses through said loop to said condenser, said transformer having two secondary windings, means applying in phase voltages through said secondary windings to said elements to vary their bilateral conductance for charging of said condenser through one of said elements and for discharge of said condenser through the other of said elements to bring the voltage thereof to correspond with the maximum amplitude of said impulses and high impedance means connected across said condenser for measuring a function of said charge.

9. A system for measuring the maximum amplitude of the output from a source of unidirectional spaced electrical impulses which comprises two triodes connected in a series loop, means biasing said triodes to plate current cut-off, a condenser in circuit with said series loop and said source, a pair of transformer secondary circuits associated with the grids of each of said triodes for simultaneously varying their bias and conductivity respectively to charge and discharge said condenser in proportion to the amplitude of said impulses, and a vacuum tube voltmeter conected across said condenser for continuously indicating the state of said charge.

10. A system for measuring the maximum amplitude of a series of spaced electrical impulses which comprises a condenser, a loop having variable bilateral conductance elements in series with said condenser, a source of said electrical impulses connected across said condenser and said loop, biasing means for normally maintaining said conductance at a low value, cam-driven means for shorting said biasing means during at least a portion of each of said electrical impulses to charge said condenser in proportion to the amplitude of said impulses, and a vacuum tube voltmeter connected across said condenser for measuring a function of said charge.

11. A peak reading continuously indicating ammeter which comprises a condenser, two electrical valves in circuit with said condenser, means interconnecting the cathode of the first of said valves, the plate of the second of said valves and first terminal of said condenser, a circuit including a source of impulses to be measured connected between the second terminal of said condenser and the plate of the first valve and the cathode of the second valve, a source of potential in the grid-cathode circuit of each of said valves to maintain them normally non-conductive, a switch in circuit with each of said sources of potential actuated in synchronism with said pulses to raise the grid-cathode potential of each of said valves thereby to form a conduction path through one of said valves during at least a portion of said pulses to charge said condenser and to form a discharge path through the other of said valves for discharge of said condenser to maintain on said condenser a charge proportional to the peak amplitude of each of said pulses, and a high impedance circuit including an indicator connected across said condenser.

12. The method of measuring the peak amplitude of spaced rectangular pulses of alternately opposite polarity which comprises changing the polarity of alternate pulses to form a series of unidirectional pulses, storing an electrical charge proportional to the peak amplitude of a pulse, measuring the magnitude of said charge, and varying said charge by an amount proportional to the algebraic sum of said measured magnitude and the maximum amplitude of the succeeding pulse substantially unaffected by the rate of change of amplitude thereof.

13. A continuously indicating peak value ammeter which comprises a condenser, two electric valves connected in a local series loop, a source of pulses to be measured connected in series with said condenser and said loop for applying said pulses to said valves to provide conduction paths for charging and discharging said condenser through said local series loop, means for developing a bias for said valves proportional to the magnitude of said pulses for limiting the conduction through said loop to peaks of said pulses, a source of bias voltage independent of said pulses normally biasing said valves to plate current cut-off to maintain a charge on said condenser during periods between said pulses, and means for measuring the voltage across said condenser.

14. A continuously indicating peak-value ammeter which comprises a condenser, two electric valves connected in a local series loop, a source of pulses to be measured connected in series with said condenser and said loop, means for biasing said valves to plate current cutoff, means for applying said pulses to said valves to raise the conductivity thereof to provide conduction paths for charging and discharging said condenser, means in circuit with said first named biasing means for developing an additional bias proportional to the magnitude of said pulses for limiting conduction through said valves to short periods at the peak value thereof whereby said condenser will be charged to a voltage equal to said peak value, and high impedance means for measuring the voltage across said condenser.

GERALD C. SUMMERS.

REFERENCES CITED

The following references are of record in the file of this patent:

UNITED STATES PATENTS

| Number | Name | Date |
| --- | --- | --- |
| 1,697,177 | Fortescue | Jan. 1, 1929 |
| 2,445,773 | Frost | July 27, 1948 |